US008540069B2

(12) United States Patent
Srb-Gaffron et al.

(10) Patent No.: US 8,540,069 B2

(45) Date of Patent: Sep. 24, 2013

(54) KINEMATICALLY-DRIVEN SLOW DELIVERY LUBRICATION SYSTEM

(75) Inventors: Walter Srb-Gaffron, Baden (AT); Uwe Fritz, Vienna (AT); Abdullah Ercan, Vienna (AT)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 13/513,971

(22) PCT Filed: Dec. 18, 2009

(86) PCT No.: PCT/US2009/068813

§ 371 (c)(1), (2), (4) Date: Jun. 5, 2012

(87) PCT Pub. No.: WO2011/075147

PCT Pub. Date: Jun. 23, 2011

(65) Prior Publication Data

US 2012/0285796 A1 Nov. 15, 2012

(51) Int. Cl.
*B65G 45/08* (2006.01)

(52) U.S. Cl.
USPC ............. 198/500; 198/321; 184/12; 184/15.1

(58) Field of Classification Search
USPC ................. 198/321, 333, 500; 184/6.5, 6.19, 184/12, 15.1, 27.1, 31
See application file for complete search history.

(56) References Cited

U.S. PATENT DOCUMENTS 3,216,553 A * 11/1965 Leach ........................... 198/500
3,993,165 A 11/1976 Pottrich
4,095,674 A 6/1978 Kido et al.
4,173,279 A * 11/1979 Lichti et al. .................. 198/500
4,213,743 A * 7/1980 Hurt et al. ..................... 198/500
4,463,587 A * 8/1984 Werner ......................... 198/500
5,033,607 A 7/1991 Rivera
5,072,821 A 12/1991 Kruse et al.
5,785,165 A 7/1998 Stahlhut et al.
5,971,229 A 10/1999 May et al.
6,125,969 A 10/2000 Graf et al.
6,176,348 B1 1/2001 Grebe et al.
6,216,822 B1 4/2001 May et al.
6,419,078 B1 * 7/2002 Leathers ....................... 198/500
6,471,033 B2 10/2002 Ulrich
6,561,316 B1 5/2003 Graf et al.
6,585,099 B2 7/2003 Babler et al.
6,601,738 B2 8/2003 Weigand et al.
6,619,429 B1 9/2003 Brand
6,802,394 B2 10/2004 Patterson et al.
7,178,634 B2 2/2007 Weigand
7,228,941 B2 6/2007 Weigand et al.
2002/0079335 A1 6/2002 Kramer
2006/0054417 A1 3/2006 Prenner
2008/0142304 A1 6/2008 Schutz et al.
2008/0217106 A1 9/2008 Eisenbacher et al.
2008/0271951 A1 11/2008 Eisenbacher et al.

* cited by examiner

*Primary Examiner* — James R Bidwell
(74) *Attorney, Agent, or Firm* — Miller, Mattias & Hull LLP

(57) ABSTRACT

Lubrication systems for transport systems are disclosed that are powered by a rotating shaft of the transport system. The lubrication system includes at least one circular member mounted on the rotating shaft. The at least one circular member is coupled to and imparts rotation to a third circular member and separately to a fourth circular member for imparting rotation there to. The third circular member is coupled to a first linkage. The first linkage extends from the third circular member to a fifth circular member. The fourth circular member is coupled to a second linkage. The second linkage couples the fourth circular member to the first linkage between the third and fifth circular members. The fifth circular member is coupled to a pump shaft.

20 Claims, 6 Drawing Sheets

KINEMATICALLY-DRIVEN SLOW DELIVERY LUBRICATION SYSTEM

CROSS-REFERENCE TO RELATED APPLICATIONS

This application is a 35 U.S.C. §371 U.S. national stage filing of International Patent Application No. PCT/US09/68813, filed on Dec. 18, 2009.

BACKGROUND

1. Technical Field

Systems and methods are disclosed for lubricating a transport system, in particular an escalator or a moving walk. The disclosed systems are driven kinematically by a rotating shaft of the transport system and converting the relatively fast rotational motion of the shaft to a slow linear motion for delivering lubricant over prolonged dispense cycles. As a result, the disclosed systems and methods use substantially less lubricant than conventional systems.

2. Description of the Related Art

An escalator includes a plurality of steps that are connected together by one or more circulating step chains forming an endless loop. The escalator steps are arranged to be able to be vertically offset relative to each other along certain portions of the endless loop to create a vertical rise. In contrast, a moving walk includes a plurality of pallets that are joined together by one or more circulating pallet chains for the horizontal transportation. In both transport systems, handrails can be provided that are driven via handrail chains. Step chains, pallet chains and handrail chains are typically coupled to one or more drive units by sheaves or sprockets driven by an electric motor.

To reduce friction and power requirements and to increase the service life of the transport system, the step, pallet and handrail chains should be lubricated at regular intervals. Additionally, escalator and moving walk systems also include parts that require regular lubrication such as bearings, other chains, ropes, etc. Preferably, the lubrication is performed automatically.

Currently available automatic lubrication systems include: "drip-feed" systems or gravity fed systems that supply lubricant intermittently in the form of droplets applied directly to parts needing lubrication; "oil-mist" or injection spray systems that spray or inject lubricant on parts needing lubrication; and continuous feed systems that deliver lubricant in the form of a stream to parts needing lubrication. Each of these lubricating systems have inherent disadvantages.

One common disadvantage is inefficient use of lubricant or wasted lubricant. Because most lubricants are derived from non-renewable petroleum sources, wasted lubricant is becoming a greater concern as companies are being encouraged to reduce their use of fossil fuels, reduce their carbon footprint and conduct themselves in environmentally sensitive ways. Further, wasted lubricant must also be safely disposed of, which may be problematic for the maintenance crew of the transport system or the building owner if a recycling facility is not readily accessible.

Returning to the disadvantages of currently available lubricating systems, drip-feed systems suffer from difficulties in terms of timing the droplet discharge from the nozzle with the link points of each chain link joint. The flow of lubricant typically cannot be easily moderated with drip-feed systems, which means that lubrication also takes place when the escalator or moving walk is stationary thereby resulting in waste.

Drip-feed systems also cannot respond adequately to environmental conditions that require different quantities of lubricant. Furthermore, different lubrication requirements of different lubrication points cannot normally be accommodated with drip-feed systems.

Oil-mist or injection-spray type systems disperse lubricant on areas that do not need lubricant, thereby contaminating the surroundings and wasting lubricant. The continuous oil feed systems discharge lubricant at too high of a rate thereby also contaminating the surroundings and wasting lubricant in a manner similar to "oil-mist" lubrication systems. As a counter-measure to the excessive lubrication, an oil pan can be disposed below the power transmission train. However, oil pans must be drained thereby requiring additional labor and maintenance expenses and oil pans obviously do not solve the lubricant waste problem. While operators can be employed to lubricate transportation chains manually, such procedures are costly and expose the operators to unnecessary dangers.

Therefore, a need exists for improved lubricant delivery systems for transport systems such as escalators and moving walks which can more efficiently deliver needed quantities of lubricant than currently available systems.

SUMMARY OF THE DISCLOSURE

In satisfaction of the aforenoted needs, lubrication systems for transport systems are disclosed that are powered by a rotating shaft of the transport system. The lubrication system comprises at least one circular member mounted on the rotating shaft. The at least one circular member is coupled to and imparts rotation to a third circular member and separately to a fourth circular member for imparting rotation thereto. The third circular member is coupled to a first linkage. The first linkage extends from the third circular member to a fifth circular member. The fourth circular member is coupled to a second linkage. The second linkage couples the fourth circular member to the first linkage between the third and fifth circular members. The fifth circular member is coupled to a pump shaft. As a result, rotation of the third and fourth circular members imparts rotational movement to the fifth circular member and axial movement of the fifth circular member and pump shaft for pumping lubricant.

A method for pumping lubricant slowly using a rotating shaft of a transport system is also disclosed. The method comprises: coaxially mounting a first circular member and a second circular member on the rotating shaft for rotation with the rotating shaft; providing coaxial third, fourth and fifth circular members and a pump shaft coaxially coupled to the fifth circular member; coupling the first circular member to a third circular member and the second circular member the fourth circular member for imparting rotation to the third and fourth circular members respectively; coupling the third circular member to a fifth circular member with a first rigid linkage; coupling the fourth circular member to the first rigid linkage with a second rigid linkage at a joint disposed between the third and fifth circular members; rotating the first and second circular members with the rotating shaft thereby rotating the third and fourth circular members thereby rotating the fifth circular member and moving the fifth circular member and pump shaft axially, thereby pumping lubricant with the pump shaft.

By varying the difference in combined diameters of the first and third circular members and the second and fourth circular members, the time period for the pump shaft to complete one cycle can be shortened or lengthened.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
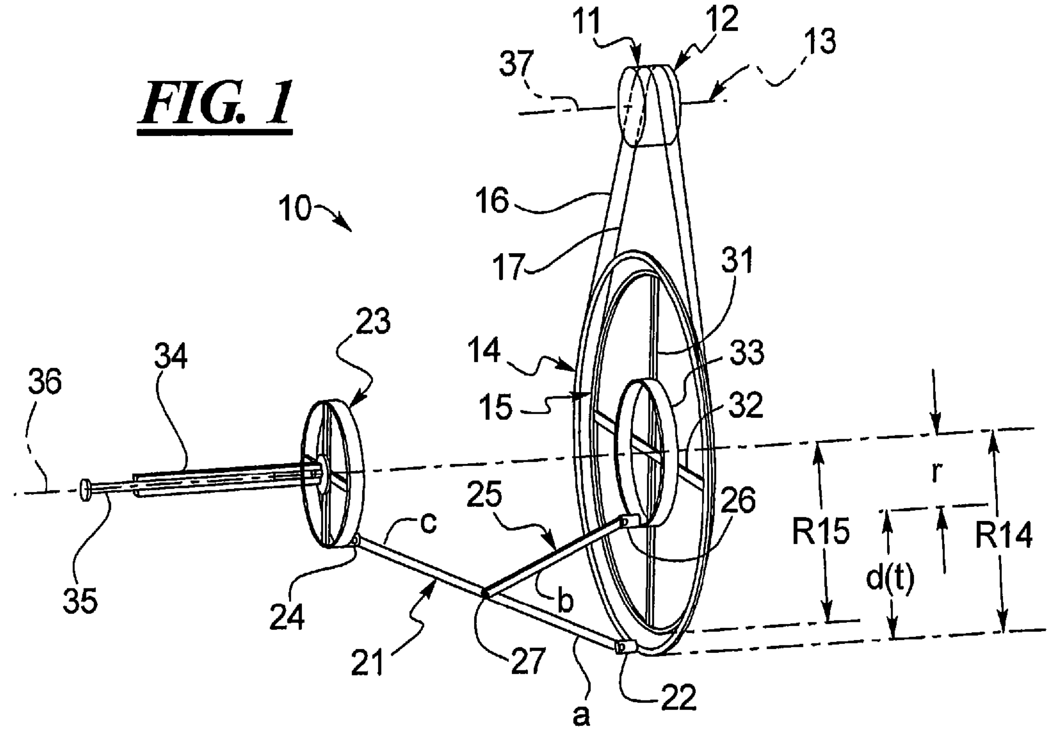
FIG. 1 diagrammatically illustrates a disclosed lubrication system in a bottom dead center position.
Figure 2:
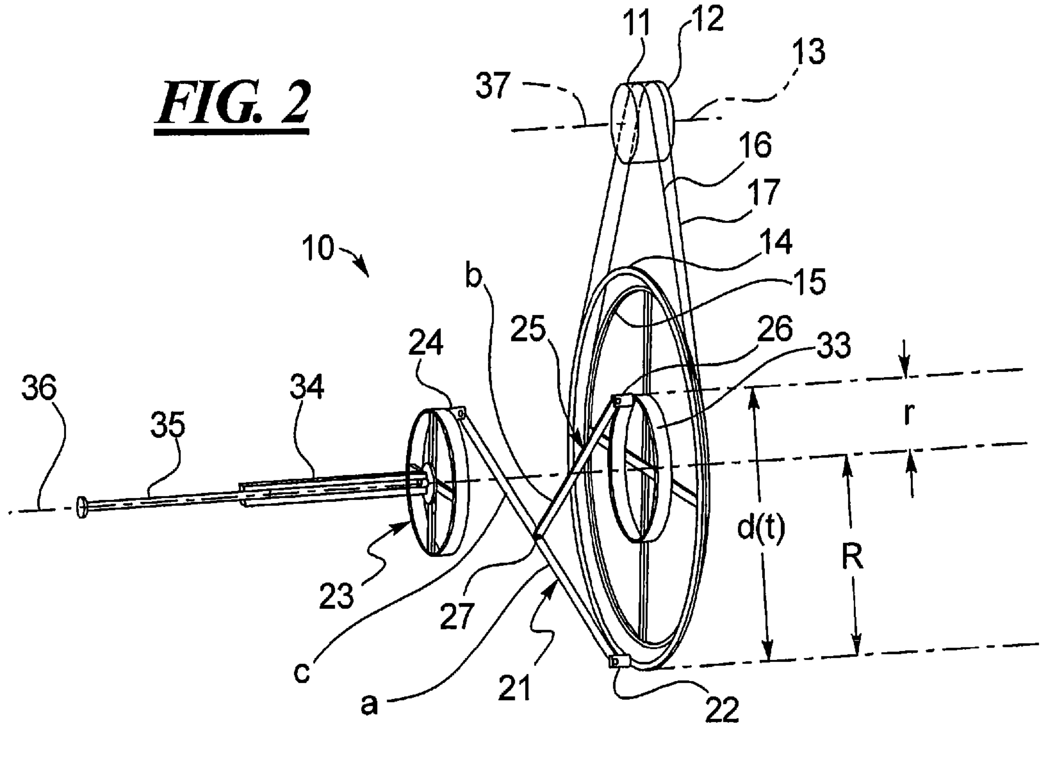
FIG. 2 diagrammatically illustrates the disclosed lubrication system of FIG. 1 in a top dead center position.
Figure 3:
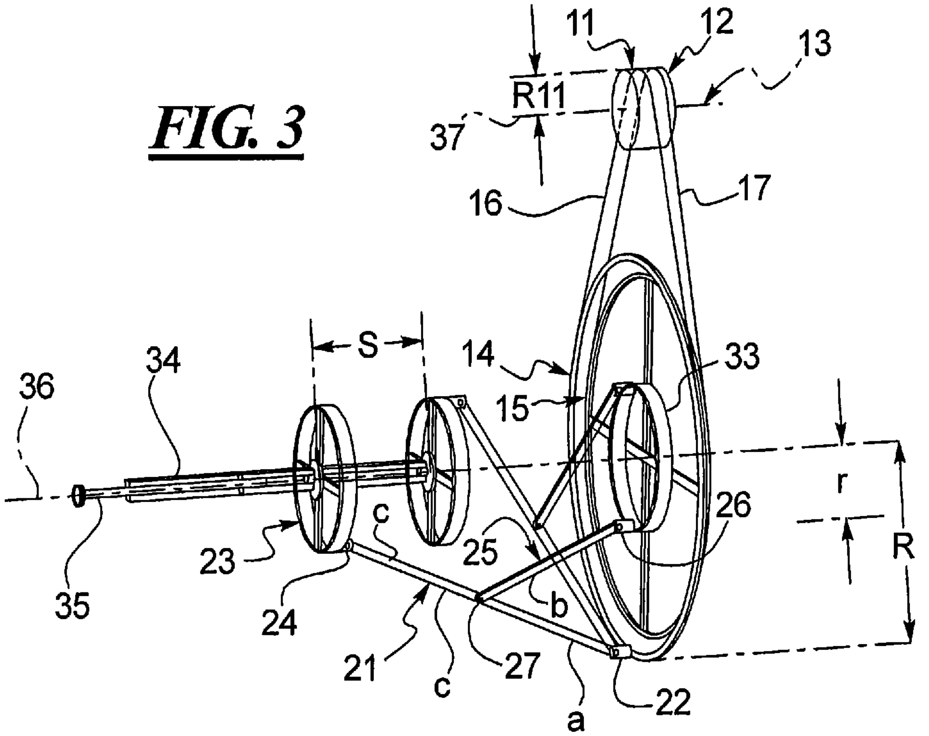
FIG. 3 is an overlay of FIGS. 1 and 2 illustrating the rotational movement of the rigid linkage members and axial movement of the pump shaft.

Turning to FIG. 1, a lubrication system 10 is illustrated with one or two circular members 11, 12 that may be provided in the form of sheaves, sprockets, wheels, pulleys, etc. In the example illustrated in FIGS. 1-3, the circular members 11, 12 are coaxially mounted on a rotating shaft shown schematically at 13 in FIGS. 1-3. The first and second circular members 11, 12 may be mounted on the rotating shaft 13 in a side-by-side fashion or a single cylindrical structure may be utilized for both circular members 11, 12. The rotating shaft 13 is part of a transport system such as an escalator or moving walk. The lubrication system 10 does not need its own power supply or motor; it simply operates using a rotating shaft 13 and does not affect the overall drive performance of the transport system. The diameters or radii of the rotating circular members 11, 12 may be identical as indicated in FIGS. 1-3, or they may differ from each other.

The first and second circular members 11, 12 are coupled to second and third circular members 14, 15 respectively. In the embodiment illustrated in FIGS. 1-3, the first and second circular members 11, 12 are coupled to the third and fourth circular members 14, 15 by chains, belts, pulleys, toothed belts, gears etc. shown schematically at 16, 17 respectively. The means for coupling the first and second circular members 11, 12 (or unitary circular member structure 11, 12) to the third and fourth circular members 14, 15 may be varied as will be apparent to those skilled in the art. The third and fourth circular members 14, 15 may also be provided in the form of sheaves, sprockets, wheels, pulleys, etc. If the first and second circular members 11, 12 are of the same size or diameter as illustrated in FIGS. 1-3, the third and fourth circular members 14, 15 should have different effective outer diameters or effective radii $R_{14}$, $R_{15}$ respectively for reasons explained below. However, it is sufficient to vary their combined diameters of the first and third circular members 11, 14 and the second and fourth circular members 12, 15 so that the fourth circular member 15 rotates any different angular speed than the third circular member 14.

Figure 7:
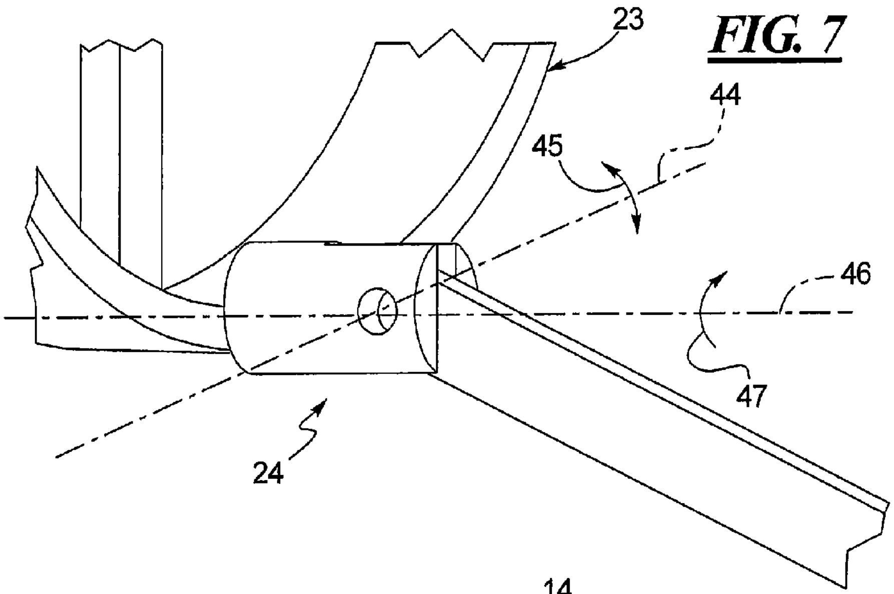
FIG. 7 is a partial perspective view illustrating an exemplary joint used to couple the linkages to the rotating circular members.

Still referring to FIG. 1, the third circular member 14 is coupled to a first linkage 21 by a joint 22. The first linkage 21 couples the third circular member 14 to a fifth circular member 23 at a joint 24. The fourth circular member 15 is coupled to the first linkage 21 by a second linkage 25. The second linkage 25 is coupled to the fourth circular member 15 by the joint 26 and to the first linkage member 21 by the joint 27. The joints 22, 24, 26, 27 may be provided in a variety of forms and most pivotal connection-type joints will suffice. An example of a suitable mechanism for the joint 24 is illustrated in FIG. 7. The joint 27 may be a simple hinge mechanism as shown in FIGS. 1-3.

In the system 10 illustrated in FIG. 1, the joint 22 is coupled to the third circular member 14 at its outer periphery. In contrast, the fourth circular member 15 includes a pair of cross-frame members 31, 32 that support an inner ring or hoop 33. The joint 26 is coupled to the inner ring 33. As a result, in the system illustrated in FIGS. 1-3, the joint 26 is disposed radially inwardly from the outer periphery of the rotating fourth circular member 15.

The fifth circular member 23 is coupled to a pump shaft 34 that may be in the form of a bearing housing or cylinder as shown in FIGS. 1-3 or a piston 35. In the system 10 illustrated in FIGS. 1-3, the outer pump shaft 34 moves axially with the fifth circular member 23 while the piston 35 remains stationary. Another option would be to have the piston 35 move with the fifth circular member 23 and the outer shaft 34 remaining stationary. The piston 35, pump shaft 34, a fifth circular member 23, fourth circular member 15 and third circular member 14 are coaxial along a common axis shown at 36. The first and second circular members 11, 12 are coaxial about the common axis shown at 37.

Referring to the common axis 36, the joint 26 is spaced apart from the axis 36 by the radius (r). The joint 22 is spaced apart from the common axis 36 by the radius $R_{14}$.

In the position shown in FIG. 1, the piston 35 is in a "bottom dead center" position with respect to the pump shaft 34 and linkages 21, 25 in their uppermost center positions with respect to the common axis 36. Comparing FIGS. 1 and 2, the fifth circular member 23 and pump shaft 34 are in a fully retracted position in FIG. 1 and in a fully extended position in FIG. 2. In FIG. 2, the piston 35 is in a "top dead center" position with respect to the pump shaft 34 and the joint 22 disposed below the common axis 36. The transition from the bottom dead center position of FIG. 1 to the top dead center position of FIG. 2 represents one complete stroke of the pump shaft 34. FIG. 3 is an overlay of the position shown in FIGS. 1 and 2 indicating the stroke distance (s).

In addition to the radial distance R between the joint 22 and common axis 36 and the radial distance (r) between the joint 26 and the common axis 36, other relevant dimensions illustrated in FIGS. 1-3 include is the variable distance d(t) between the two joints 22, 26, the length (a) between the joints 22, 27, the length (b) between the joints 26 and 27 (or the length of the second linkage 25) and the length (c) between the joints 27, 24. The overall length of the first linkage 21 is the sum of (a) and (c).

Figure 4:
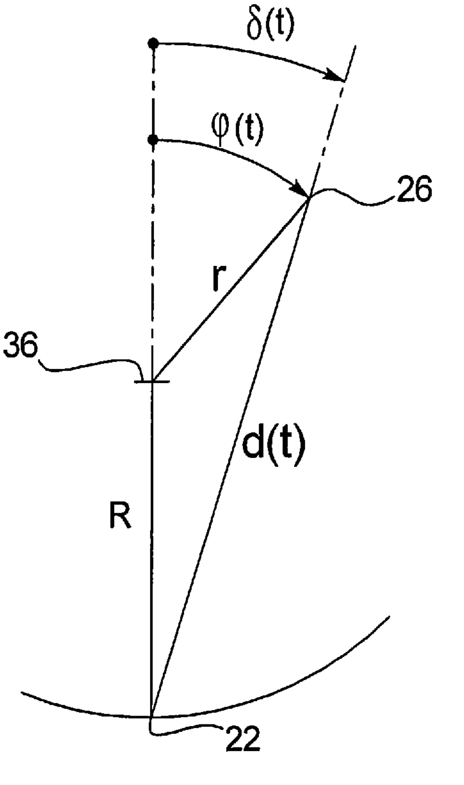
FIGS. 4-5 graphically illustrate the X-Y plane in the linkage plane as defined by (1) the linkage coupling the third circular member to the fifth circular member, (2) the linkage coupling the fourth circular member to the third and fifth circular members and (3) the fifth circular member, and for explaining the mathematical derivations described below that are based on the spatial relationships illustrated in FIGS. 1-3.
Figure 5:
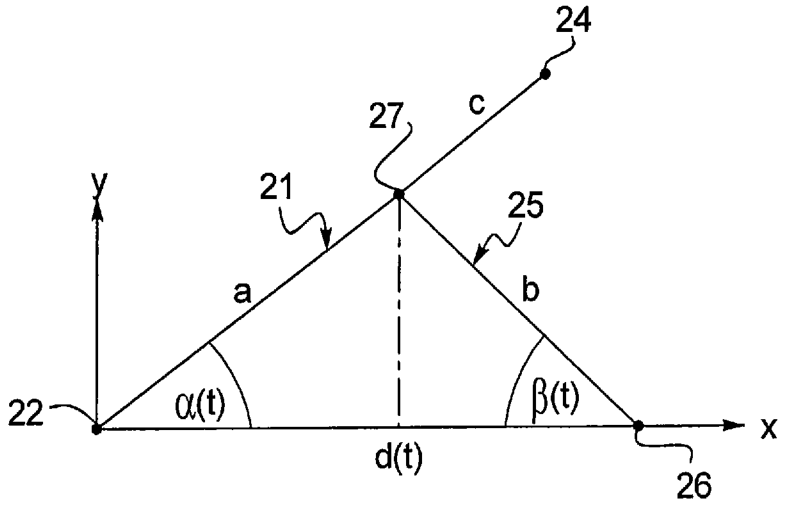

The first and second circular members 11, 12 are coaxial as noted above and rotate with the same relatively high angular speed, but do not necessarily have the same diameter. The third and fourth circular members 14, 15, rotate at slightly different angular speeds due to their different radii $R_{14}$, $R_{15}$ respectively. If the first and second circular members 11, 12 have different sizes, then the third and fourth circular members 14, 15 can be of the same size. The third and fourth circular members 14, 15 are also not necessarily coaxial. Each of the circular members 14, 15 is coupled to one of the linkages 21, 25 respectively. The plane in which the linkages 21, 25 are disposed can be either parallel to the plane of the circular members 14, 15 or inclined with respect to the plane of the circular members 14, 15. In FIGS. 4-5, the plane in which the first and second linkages 21, 25 are disposed is perpendicular to the planes of the third and fourth circular members 14, 15. The linkage joint distances (a), (b), (c) are equal in the example illustrated in FIGS. 1-3 but may be different from one another. Rotation of the linkages 21, 25 provide a rotational and linear axial movement of the output joint 24, which disposed on the fifth circular member 23. As a result, the first and second linkages 21, 25 and the output joint 24 rotate circularly and move axially the stroke distance (s) in response to rotation of the third and fourth circular members 14, 15 as illustrated in FIGS. 1-3.

Due to the spacing of the linkage joints 22, 26, 27, the output joint 24 moves circular with the same diameter of the ring 33 and reiteratively and parallel to the common axis 36. The output joint 24 is connected to the fifth circular member 23 which follows the circular and axial movement of the output joint 24. The bush bearing housing or pump shaft 34 is mounted on the axis 36 and moves axially with the fifth circular member 23. A piston 35 can be mounted in the shaft 34 or vice versa. The iteration period or stroke period time is dependent on the absolute value of the angular velocity difference |ω14−ω15| between member 14 and member 15 due to the fact that the angular velocities ω14=ω22 and ω15=ω26 are always the same the absolute angular velocity difference can be also expressed by |ω22−ω26|. This difference is dependant on ratio $i_{11}=R_{11}/R_{14}$ (the ratio between first member 11 and third member 14) and ratio $i_{12}=R_{12}/R_{15}$ (the ratio between second member 12 and fourth member 15) and the according input angular velocities ω11 of member 11 and ω12 of member 12. The smaller the absolute value of the angular velocity difference |ω22−ω26| the longer the stroke period t. t is infinite when the difference |ω22−ω26| is zero. The ratio R/r (or better the difference R−r) has an influence on the stroke distance s in conjunction with the linkage dimensions a, b, c but, in the disclosed example, only a as seen in equation 3.14. Ratios of the radii $R_{11}$, $R_{12}$ of the small circular members 11, 12 and the radii $R_{14}$, $R_{15}$ of the larger circular members 14, 15 can vary greatly as will be apparent to those skilled in the art.

Referring to FIG. 4, a coordinate system is shown for the XY plane in which the linkage members 21, 25 are disposed as indicated by the joints 22, 26. The angle φ represents the relative deviation angle between the joint 26 and the common axis 36 which results due to the different angular velocities $\omega_{22}$, $\omega_{26}$ of the joints 22, 26 disposed on third and fourth circular members 14, 15 respectively:

$$\phi(t)=|0t\int\omega_{22}-\omega_{26}dt| \quad (0.1)$$

The variable distance d (t) between the joints 22, 26 can be represented by $$d(t)=r(\sin(\phi(t))/\sin(\delta(t))) \quad (0.2)$$

The following kinematical equations and assumptions from the geometry in the top view plane (FIG. 4) may be used:

$$d=((R+r\cos(\phi))^2+(r\sin(\phi))^2)^{1/2} \quad (1.1)$$

$$d=(R^2+2Rr\cos(\phi)+r^2)^{1/2} \quad (1.1.1)$$

The following general kinematical equations and assumptions from the geometry in the XY plane (FIG. 5) may also be used:

$$a\sin(\alpha)=b\sin(\beta) \quad (2.1)$$

$$\cos(\beta)=(1-(a/b\sin(\alpha))^2)^{1/2} \quad (2.1.1)$$

$$d=a\cos(\alpha)+b\cos(\beta) \quad (2.2)$$

$$d-a\cos(\alpha)=b(1-(a/b\sin(\alpha))^2)^{1/2} \quad (2.2.1)$$

$$d^2-2ad\cos(\alpha)+a^2(\cos(\alpha))^2=b^2-a^2(\sin(\alpha))^2=b^2-a^2+a^2(\cos(\alpha))^2 \quad (2.2.2)$$

$$d^2+[-2a\cos(\alpha)]d+[a^2-b^2]=0 \quad (2.2.3)$$

$$p=[-2a\cos(\alpha)] \quad (2.2.3.1)$$

$$q=[a^2-b^2] \quad (2.2.3.2)$$

$$d_{1,2}=-p/2\pm((p/2)^2-q)^{1/2} \quad (2.2.3.3)$$

The distance d is dependent of a (FIG. 5) and can be expressed as:

$$d=a\cos(\alpha)\pm(a^2(\cos(\alpha))^2+b^2-a^2)^{1/2} \quad (2.2.3.4)$$

The velocity of the fifth circular member 23 may be calculated as follows. Assuming that a=b, Equation 2.2.14 can be rewritten as:

$$d=a\cos(\alpha)\pm a\cos(\alpha) \quad (3.2)$$

With the only non trivial solution being d=2a cos(α). Rewriting equation 1.1.1 for d in dependency of φ provides the following expression:

$$d=2a\cos(\alpha)=(R^2+2Rr\cos(\phi)+r^2)^{1/2} \quad (3.4)$$

$$\cos(\alpha)=(R^2+2Rr\cos(\phi)+r^2)^{1/2}/2a \quad (3.4.1)$$

The Y-position of the fifth circular member 23 can then be expressed as:

$$y(\alpha)(24)=(a+c)\sin(\alpha) \quad (3.5)$$

$$y(\alpha)(24)=(a+c)(1-(\cos(\alpha))^2)^{1/2} \quad (3.5.1)$$

The X-position of the fifth circular member can then be expressed as:

$$x(\alpha)(24)=(a+c)\cos(\alpha) \quad (3.6)$$

$$x(\alpha)(24)=(a+c)(R^2+2Rr\cos(\phi)+r^2)^{1/2}/2a \quad (3.6.1)$$

Assuming c=a, the Y-position of the fifth circular member 23 can be written as:

$$y(\phi)(24)=(4a^2-R^2-2Rr\cos(\phi)-r^2)^{1/2} \quad (3.8)$$

Equation (3.8) can be differentiated for the following Y-velocity equation:

$$y'(\phi)(24)=R\sin(\phi)(4a^2-R^2-2Rr\cos(\phi)-r^2)^{-1/2} \quad (3.9)$$

The maximum/minimum Y-position of the fifth circular member 23 can be found by $$y'(\phi)(24)=0=R\sin(\phi) \quad (3.10)$$

with two solutions for $\phi_{1,2}=0;\ \pi$. The top Y-position can be expressed as follows:

$$\phi_{top}=\pi$$

$$y(\phi)(24)top=(4a^2-R^2+2Rr-r^2)^{1/2}=(4a^2-(R-r)^2)^{1/2} \quad (3.12)$$

For the bottom Y-position, $\phi_{bottom}=0$ and, $$y(\phi)(24)_{bottom}=(4a^2-R^2+2Rr-r^2)^{1/2}=(4a^2-(R+r)^2)^{1/2} \quad (3.13)$$

With equation (3.12) and (3.13) the stroke distance s (FIG. 3) can be expressed as $$s=(4a^2-(R-r)^2)^{1/2}-(4a^2-(R+r)^2)^{1/2} \quad (3.14)$$

Equation (3.12) provides the geometrical boundary condition for the minimum dimension for linkage distance a:

$$a\geqq(R+r)/2 \quad (3.15)$$

The calculation of the stroke period is as follows. Using equation (0.1)

$$\phi(t)=|0t\int\omega_{22}-\omega_{26}dt| \quad (0.1)$$

For one stroke ($\phi=2\pi$), a certain time period is required. With $$\omega_{22},\omega_{26}=\text{const}(d\omega/dt=0) \quad (4.1)$$

Equation (0.1) can be rewritten as $$2\pi=t|\omega_{22}-\omega_{26}| \quad (4.2)$$

The angular velocity where $R_{14}$ (Equations 03, 09) is the radius of the driven circular member 14 (and the joint 22 is disposed on the outer periphery of the member 14 with the radius R. $R_{15}$ is the radius of the driven circular member 15 and the joint 26 is disposed with the radius r. $v_{22}$, $v_{26}$ the corresponding circumferential velocities of the joints 22, 26 can be expressed as:

$$\omega_{22}=v_{22}/R \quad (4.3)$$

$$\omega_{26}=v_{26}/r \quad (4.4)$$

Using $v_0$ as the circumferential velocity of the first and second circular members 11, 12 and $\omega_0$ the corresponding angular velocity of the first and second circular members 11, 12, and $R_0$ as the radius of the first and second circular members 11, 12. The angular velocities of the joints 22, 26 disposed on the third and fourth circular members 14, 15 can be expressed as:

$$\omega_{22}=\omega_0R_0/R_{14} \quad (4.6)$$

$$\omega_{26}=\omega_0R_0/R_{15} \quad (4.7)$$

With corresponding ratios expressed as:

$$R_0/R_{14}=i_{22} \quad (4.8)$$

$$R_0/R_{15}=i_{26} \quad (4.9)$$

$\omega_{22}$, $\omega_{26}$ can be rewritten as:

$$\omega_{22}\omega_0i_{22} \quad (4.10)$$

$$\omega_{26}=\omega_0i_{26} \quad (4.11)$$

Equation (4.2) can then be rewritten as:

$$\omega_0(i_{26}-i_{22})t=2\pi \quad (4.12)$$

with $$\omega_0=n_0\pi/30\ [n_0 \text{ is in Rpm}] \quad (4.13)$$

$$\Delta i=(i_{22}-i_{26}) \quad (4.14)$$

The stroke period can be expressed as $$t=60/n_0\Delta i\ [t \text{ in second}] \quad (4.15)$$

The radius dimensions dependent on the required stroke period (t) can be expressed as:

$$R_0/R_{14}-R_0/R_{15}=\Delta i=60/(n_0t) \quad (5.1)$$

$$R_0((R_{14}-R_{15})/R_{14}R_{15})=\Delta i \quad (5.2)$$

$$R_{14}-R_{15}=\Delta R \quad (5.3)$$

$$\Delta R=\Delta iR_{14}R_{15}/R_0=R_{14}\Delta i/i_{26}=R_{14}60/(i_{26}n_0t) \quad (5.4)$$

With $R_{15}=R_{14}-\Delta R$, a relation between the radii and the stroke period can be expressed as:

$$R_{15}=R_{14}(1-60/(i_{26}n_0t)) \quad (5.6)$$

Figure 6:
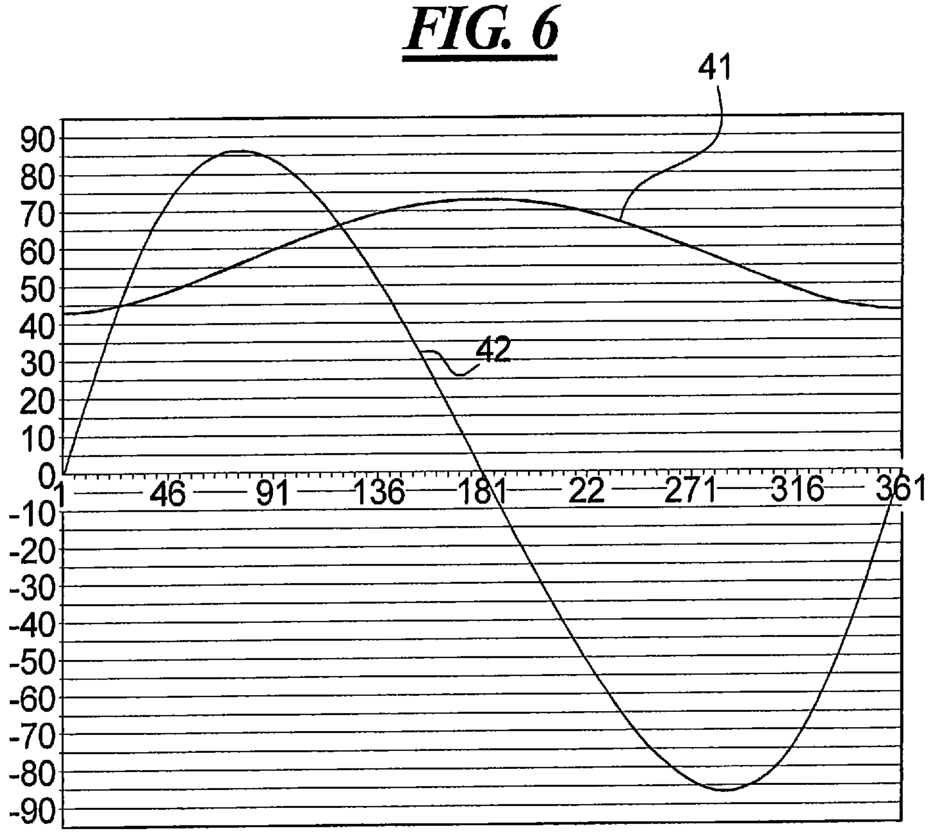
FIG. 6 graphically illustrates the axial position of the fifth circular member as a function of the rotational position of the fifth circular member during one complete stroke cycle.

An example is illustrated graphically in FIG. 6 wherein: R=50.0 mm; $r=R_{26}=R_{23}=17.5$ mm; a=40.0 mm; $n_0=60.0$ rpm; $\omega_0=60*\pi/30=2\pi$; $R_0=10.0$ mm ($=R_{11}=R_{12}$); $R_{14}=51.25$ mm; and $R_{15}=46.0$ mm. In FIG. 6, the Y-position of the joint 24 is indicated by the curve 41 and Y-velocity over $\phi°$ of the output joint 24 is indicated by the curve 42 for one complete stroke cycle. The following results are produced: stroke distance s=30.16 mm; ratios: $i_{22}=R_0/R_{14}=10/51.25=0.19607$ [23], $i_{26}=R_0/R_{15}=10/46=0.21739$; $\Delta i=i_{26}-i_{22}=0.02131$; rotation velocities $\omega_{22}=1.232$ ($n_{22}=11.76$), $\omega_{26}=1.366$ ($n_{26}=13.04$); stroke period)(360°) t=60/n0Δi=60/(60*0.02131)=46.92 sec.

FIG. 7 illustrates one example of a mechanism that may be used for the joint 24 as well as the joints 22 and 26. The joints 24, 22, 26 must be able to rotate about two axes. In FIG. 7, the joint 24 rotates about the axis 44 as indicated by the arrow 45 and about the axis 46 as indicated by the arrow 47. Other types of pivoting joints will be apparent to those skilled in the art.

Figure 8:
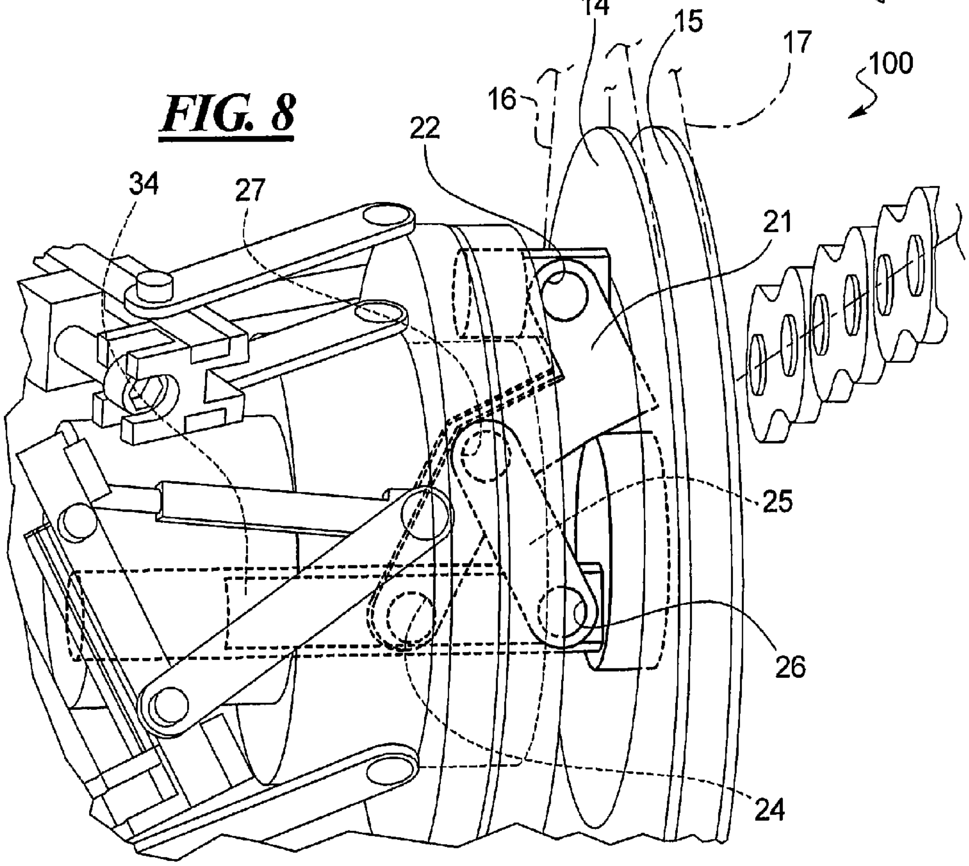
FIGS. 8-10 illustrate the incorporation of three disclosed lubrication systems in a transport drive system.
Figure 9:
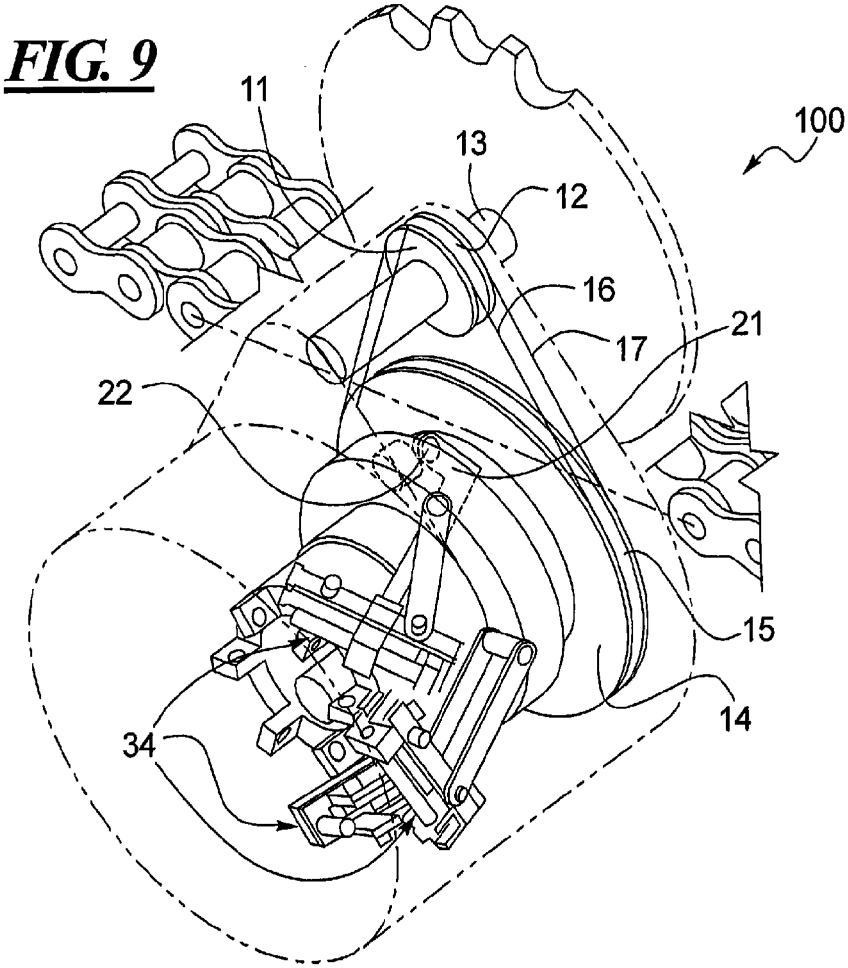
Figure 10:
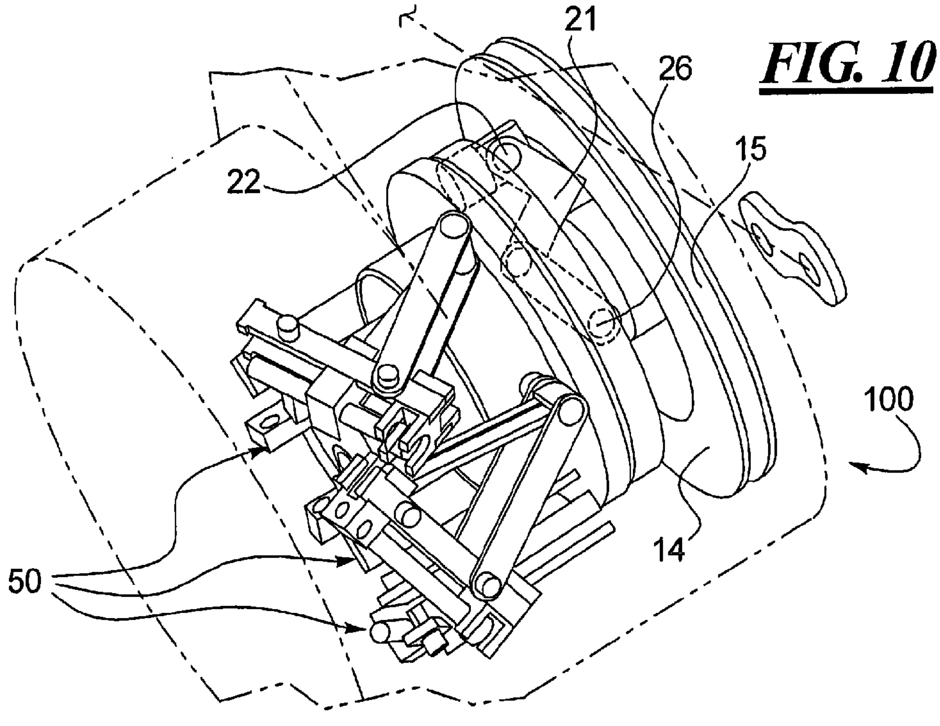

FIGS. 8-10 illustrate the incorporation of a disclosed lubrication system 10 in a transport system, in this case, a moving walk 100. One lubrication system 10 can be used to drive several pumps 50 although only three pumps 50 are illustrated in FIG. 10.

Figure 11:
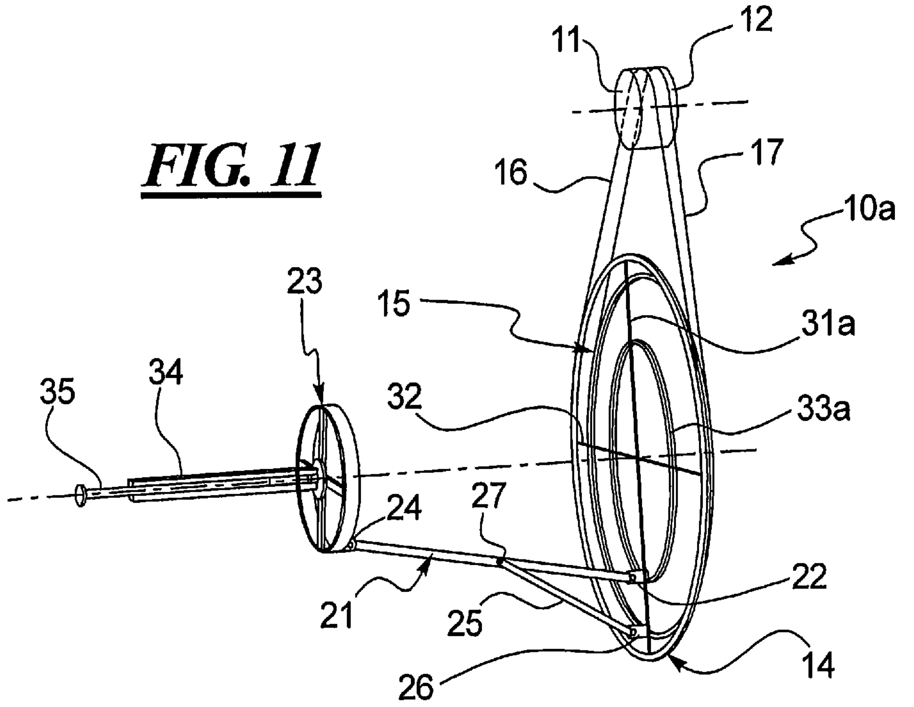
FIGS. 11-12 diagrammatically illustrate two additional disclosed lubrication systems in their respective bottom dead center positions.
Figure 12:
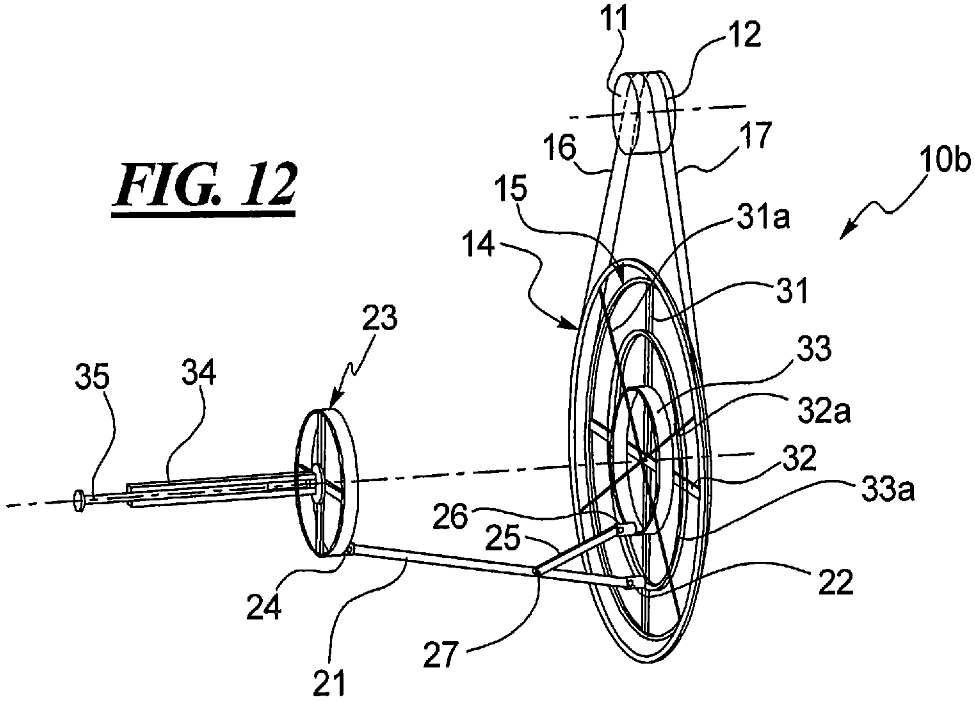

Finally, FIGS. 11-12 illustrate systems **10*a* and 10*b* respectively. In the system 10*a*, in contrast to the system 10 illustrated in FIGS. 1-3 above, the joint 22 is disposed radially inwardly from the outer periphery of the driven circular member 14. An inner ring 33*a* is mounted to the circular member 14 on crossbars 31*a*, 32*a*. Joint 26 is disposed at the outer periphery of the driven circular member 15. In FIG. 12, two inner rings 33, 33*a* are used on both circular members 15, 14 respectively to move the joints 26, 22 radially inwardly from the outer peripheries of the circular members 15, 14** respectively.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A lubrication system driven by a rotating shaft, the system comprising:

at least one circular member mounted on the rotating shaft, the at least one circular member being coupled to and imparting rotation to a third circular member and being coupled to and imparting rotation to a fourth circular member;

the third circular member being coupled to a first linkage, the first linkage extending from the third circular member to a fifth circular member, the fourth circular member being coupled to a second linkage, the second linkage coupling the fourth circular member to the first linkage between the third and fifth circular members;

wherein the fifth circular member is coupled to a pump shaft;

whereby rotation of the third and fourth circular members imparts rotational movement to the fifth circular member and imparts axial movement to the fifth circular member and pump shaft, which in turn pumps lubricant.

2. The system of claim 1 wherein the third circular member includes an outer periphery, the third circular member coupled to the first linkage at a first joint disposed along the outer periphery of the third circular member.

3. The system of claim 1 wherein the fourth circular member includes an outer periphery, the fourth circular member coupled to the second linkage at a second joint disposed radially inwardly from the outer periphery of the fourth circular member.

4. The system of claim 1 wherein the at least one circular member comprises first and second circular members coaxially mounted to the rotating shaft.

5. The system of claim 1 wherein the third and fifth circular members include outer peripheries, the first linkage extending between and pivotally coupling the outer peripheries of the third and fifth circular members.

6. The system of claim 1 wherein the fourth circular member comprises an outer periphery that is coupled to the at least one circular member, the fourth circular member further comprising an inner ring, the second linkage being coupled to the inner ring of the fourth circular member at a first joint disposed radially inwardly from the outer periphery of the fourth circular member, second linkage pivotally coupling the inner frame of the fourth circular member to the first linkage at a second joint disposed between the third and fifth circular members.

7. The system of claim 1 wherein the pump shaft is a cylinder.

8. The system of claim 1 wherein the pump shaft is a piston.

9. The system of claim 4 wherein first and second circular members have diameters that are about equal.

10. A lubrication system driven by a rotating shaft, the system comprising:

a first circular member and a second circular member coaxially mounted on the rotating shaft for rotation with said rotating shaft, the first circular member being coupled and imparting rotation to a third circular member, the second circular member being coupled and imparting rotation to a fourth circular member;

combined diameters of the first and third circular members being different than combined diameters of the second and fourth circular members;

the third circular member-being pivotally coupled to a first rigid linkage, the first rigid linkage extending from the third circular member to a fifth circular member and being pivotally coupled to the fifth circular member, the fourth circular member being pivotally coupled to a second rigid linkage, the second rigid linkage pivotally coupling the fourth circular member to the first rigid linkage between the third and the fifth circular members;

the fifth circular member being coaxially mounted to a pump shaft;

wherein rotation of the third and fourth circular members imparts rotational movement to the fifth circular member and imparts axial movement to the fifth circular member and pump shaft, which in turn pumps lubricant.

11. The system of claim 10 wherein the third circular member includes an outer periphery, the third circular member-coupled to the first rigid linkage at a first joint disposed along the outer periphery of the third circular member.

12. The system of claim 10 wherein the fourth circular member includes an outer periphery, the fourth circular member coupled to the second rigid linkage at a second joint-disposed radially inwardly from the outer periphery of the fourth circular member.

13. The system of claim 10 wherein the first, second, third and fourth circular members include outer peripheries, the outer periphery of the first circular member being coupled to the outer periphery of the third circular member, the outer periphery of the second circular member being coupled to the outer periphery of the fourth circular member.

14. The system of claim 10 wherein the third and fifth circular members include outer peripheries, the first rigid linkage extending between and pivotally coupling the outer peripheries of the third and fifth circular members together.

15. The system of claim 10 wherein the fourth circular member comprises an outer periphery that is coupled to the second circular member, the fourth circular member further comprising an inner frame, the second rigid linkage being coupled to the inner frame of the fourth circular member at a first joint-disposed radially inwardly from the outer periphery of the fourth circular member, second rigid linkage pivotally coupling the inner frame of the fourth circular member to the first rigid linkage at a second joint disposed on the first rigid linkage between the third and fifth circular members.

16. The system of claim 10 wherein the pump shaft is a cylinder.

17. The system of claim 10 wherein the pump shaft comprises a piston axially disposed within a cylinder.

18. The system of claim 10 wherein first and second circular members have diameters that are about equal.

19. A method for pumping lubricant slowly using a rotating shaft of a transport system, the method comprising:

coaxially mounting a first circular member and a second circular member on the rotating shaft for rotation with the rotating shaft;

providing coaxial third, fourth and fifth circular members and a pump shaft coaxially coupled to the fifth circular member;

coupling the first circular member to the third circular member and the second circular member the fourth circular member for imparting rotation to the third and fourth circular members respectively;

coupling the third circular member to the fifth circular member with a rigid first linkage;

coupling the fourth circular member to the first rigid linkage with a second rigid linkage at a joint disposed between the third and fifth circular members;

rotating the first and second circular members with the rotating shaft thereby rotating the third and fourth circular members, thereby rotating the fifth circular member and causing the fifth circular member and pump shaft to move axially, thereby pumping lubricant with the pump shaft.

20. The method of claim 19 wherein the providing of the third and fourth circular members further comprises providing the third and fourth circular members with different diameters whereby varying a ratio of the fourth diameter to the third diameter varies a pump cycle period of the pump shaft.

* * * * *